H. R. KOEHLER.
LIQUID MEASURING APPARATUS.
APPLICATION FILED JUNE 30, 1921.
1,421,499.
Patented July 4, 1922.
2 SHEETS—SHEET 2.
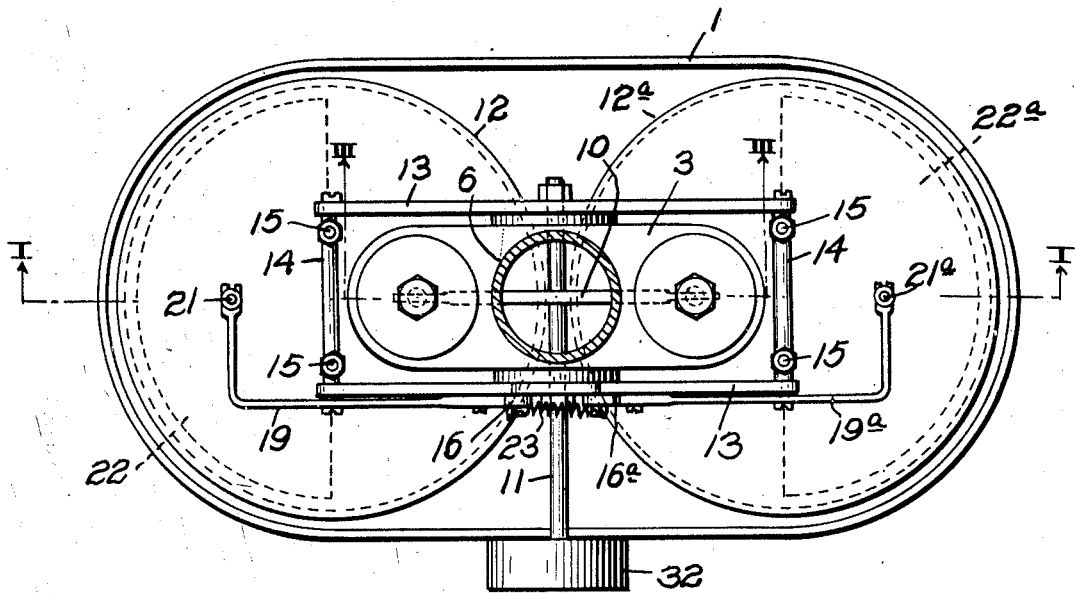
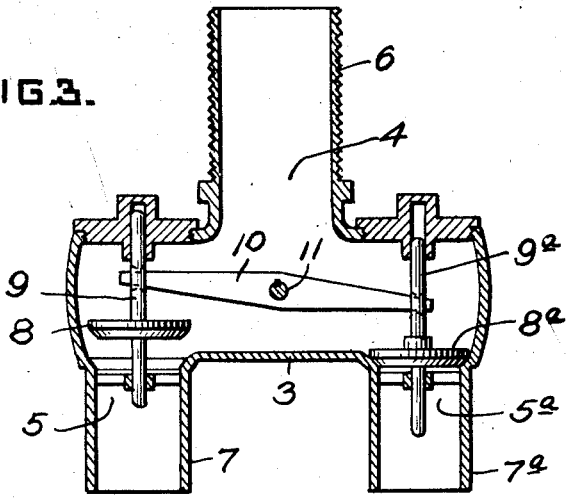
WITNESSES
J. Herbert Bradley.
INVENTOR
Howard R. Koehler,
by Winter & Brown,
his attorneys.

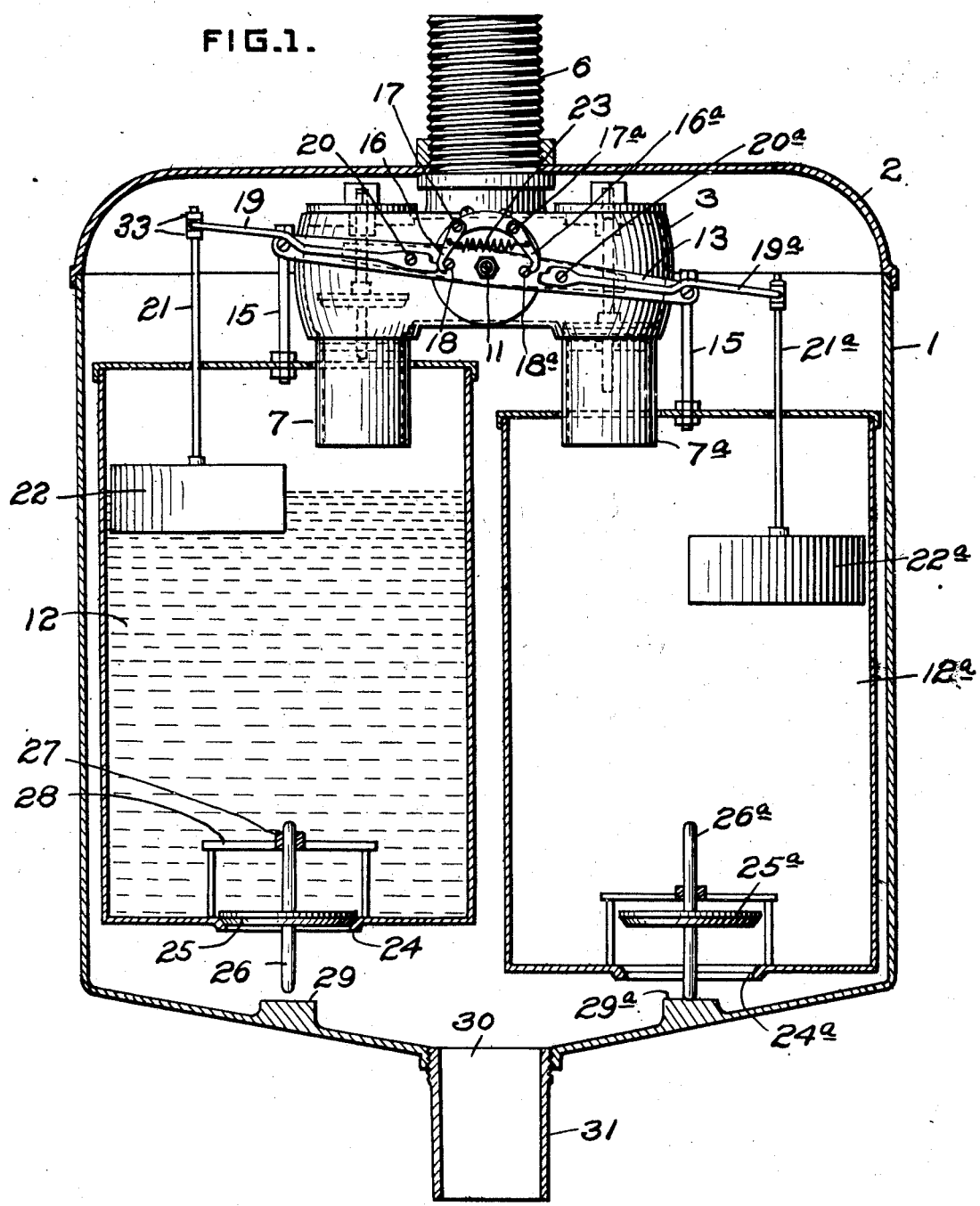

UNITED STATES PATENT OFFICE.

HOWARD R. KOEHLER, OF MONACA, PENNSYLVANIA.

LIQUID-MEASURING APPARATUS.

1,421,499. Specification of Letters Patent. Patented July 4, 1922.

Application filed June 30, 1921. Serial No. 481,530.

*To all whom it may concern:*

Be it known that I, HOWARD R. KOEHLER, a citizen of the United States, and a resident of Monaca, in the county of Beaver and State of Pennsylvania, have invented a new and useful Improvement in Liquid-Measuring Apparatus, of which the following is a specification.

The invention relates to liquid measuring apparatus, and while unlimited to apparatus for measuring any specific kind of liquid, it is particularly applicable to the measuring of gasoline, oil, and the like, while being discharged from a tank car or like carrier into a stationary receptacle, such as an underground gasoline tank.

The object of the invention is to provide an apparatus for the purpose stated which will be simple in construction, compact in form, and which will accurately measure the liquid without interrupting its flow.

The invention is illustrated in the accompanying sheets of drawings of which Fig. 1 is a vertical sectional view of the apparatus, the plane of view being indicated by the line I—I, Fig. 2; Fig. 2 a plan view of the apparatus with the cover of the casing removed; and Fig. 3 a vertical sectional view of one of the parts of the apparatus, the plane of view being indicated by the line III—III, Fig. 2.

In the practice of the invention a pair of measuring tanks are mounted for simultaneous opposite movements from one to another of alternate positions. Each tank communicates with a manifold or like member having two outlets and an inlet adapted to be connected to a conduit leading from a supply tank, and the measuring tanks are provided with outlets controlled by valves. A mechanism, operated by floats arranged in the tanks, is provided for controlling the positions of the tanks and in consequence thereof for controlling the operations of the valves. The general arrangement is such that the tanks are alternately filled and emptied by the continuously flowing liquid, each tank being filled with a predetermined amount of the liquid before being emptied. A register is suitably attached to a movable part of the apparatus in such manner as to be advanced in coordination with the movements of the tanks, whereby the total volume of liquid that passes through the apparatus is indicated.

The entire mechanism is preferably mounted within a casing 1, provided with a covering 2. Within the casing there is mounted a manifold 3 provided with an inlet 4 and with a pair of discharge outlets 5 and 5ª. The inlet may take the form of an exteriorly threaded tube 6, adapted to be attached to a filling conduit and at the outlets there may be downwardly projecting tubes 7 and 7ª. The outlets are controlled by valves 8 and 8ª provided with stems 9 and 9ª adapted to be guided by suitable bosses formed in the manifold. To control the operation of the valves, their stems are preferably connected to the opposite ends of a lever 10 keyed to a shaft 11 extending transversely through the central portion of the manifold and projecting from one side thereof.

Measuring tanks 12 and 12ª are preferably suspended one from each end of a walking beam 13 keyed to shaft 11. The walking beam may be a rectangular frame comprising side members 13 and end members 14, each tank being suspended by a pair of rods 15 attached to the end members of the walking beam. In Fig. 1 the tanks are shown in one of their alternate positions, tank 12 being in filling position and tank 12ª in emptying position. To hold the tanks in these positions until tank 12 has been filled to the proper level, suitable locking means are provided. Such locking means preferably include a latch 16 pivoted at 17 to the side of the manifold, and a pin 18 attached to a side member 13 of the walking beam. The form of the hooked end of latch 16, and the relative positions of its pivot point 17 and the pin 18 are such that the latch will hold the walking beam in its indicated position against the action of the weight of the liquid within tank 12 only when the latch is positively held against pin 18. For so holding the latch, there is preferably provided a lever 19 pivoted at 20 to a side member 13 of the walking beam. From the outer end of lever 19 there is suspended by means of a rod 21 a float 22 arranged in tank 12, and preferably of semi-cylindrical form, as indicated. The other end of lever 19 is constructed to bear against the outer face of latch 16. By this arrangement when the liquid in tank 12 rises to the required level, float 22 is elevated and in consequence thereof the inner end of lever 19 is moved downwardly so that tank 12, weighted by the liquid in it, causes the walking beam to swing to its opposite position. To positively urge latch 16 to its pin-engaging position, a suitable spring 23 may be provided.

Tank 12$^a$ is provided with a float 22$^a$ connected to a lever 19$^a$ adapted to lock a latch 16$^a$ in the same manner and for the same purpose as explained with reference to tank 12.

The tanks are provided with outlets 24 and 24$^a$. For controlling flow through outlet 24, there is provided a valve 25 having a stem 26 adapted to be guided by a boss 27 formed in a cage 28 carried by tank 12. When this tank is in its upper position the lower end of stem 26 is preferably slightly above an abutment 29 formed in the bottom of casing 1 immediately below the stem. When tank 12 is in its lower position, that is to say, the position in which the tank 12$^a$ is indicated, stem 26 rests upon abutment 29 and holds valve 25 in its open position. In the same manner tank 12$^a$ is provided with valve 25$^a$ having a stem 26$^a$ adapted to rest against an abutment 29$^a$.

The bottom of casing 1 is provided with a discharge outlet 30 from which there may extend a tube 31 adapted to be inserted into the upper end of a filling tube or conduit of an underground tank or other receptacle into which it is desired to discharge the measured liquid.

To register the volume of liquid flowing through the apparatus, a suitable dial register 32 may be mounted upon the outside of casing 1 and be operatively connected to the shaft 11, the arrangement being such that the register is advanced each time the tanks move from one to the other of their alternate positions. The tanks may be constructed to hold any desired volume of liquid, but in practice it has been found that tanks capable of holding a little more than four quarts apiece are satisfactory. By so constructing the measuring tanks, the register may be arranged to read gallons.

In the operation of the apparatus, the positions of floats 22 and 22$^a$ are first adjusted so that the floats will rise the desired amount when a predetermined volume of liquid is in the tank. This adjustment may be effected by manipulating nuts 33 on the upper end of rods 21 and 21$^a$. With the several parts of the apparatus in the relative positions indicated in the drawings, liquid flowing through the manifold inlet 4 is discharged through the manifold outlet 5 into tank 12, as liquid from tank 12$^a$ is being emptied into the bottom of casing 1 from which it is discharged through the casing outlet tube 31. In this position of parts manifold valve 8 is open and valve 8$^a$ closed, and tank outlet valve 25$^a$ is open and tank valve 25 closed so that the liquid will flow in the manner just explained.

When the liquid in tank 12 rises to the predetermined level, float 22 rises and lifts the outer end of lever 19 with the result that its inner end is released from latch 16. The weight of liquid in tank 12 then causes the walking beam to rock so that tank 12 moves to its lower position and tank 12$^a$ rises to its upper position. In this position of the tanks, latch 16$^a$ engages pin 18$^a$ to lock the walking beam against movement. During the movement of the tanks, shaft 11 is rocked and by such movement valves 8 and 8$^a$ are reversed, these valves being moved by lever 10 connected to shaft 11. Also, when tank 12 moves to its lower position, valve 25 is open to permit flow of liquid through tank outlet 24 and valve 25$^a$ is closed. This cycle of operation is repeated during the entire period of the flow of liquid through the manifold inlet, and each unit volume measured by the measuring tanks is recorded by the register 32.

The apparatus may be used, as previously explained, in measuring the volume of gasoline discharged from a tank car into an underground storage reservoir, and when so used, there is eliminated the possibility of making short measurements.

According to the provisions of the patent statutes I have described the principle and operation of my invention together with the apparatus which I now consider to represent the best embodiment thereof. However, I desire to have it understood that within the scope of the appended claims, the invention may be practiced by other forms of construction than that specifically shown and described herein.

I claim:

1. In a liquid measuring apparatus, the combination of a manifold having an inlet and two outlets, valves controlling flow through said outlets, a pivoted walking beam, releasable means for holding said beam in alternate positions, a pair of measuring tanks attached one to each end of said beam and each provided with an opening communicating with one of said manifold outlets, each tank being provided with an outlet, valves controlling flow through the tank outlets and operated by movements of said tanks, and means including a float in each tank for controlling said manifold inlet valves and the movements of said tanks.

2. In a liquid measuring apparatus, the combination of a manifold having an inlet and two outlets, valves controlling flow through said outlets, a pivoted walking beam connected to said valves for operating them, a pair of measuring tanks attached one to each end of said beam and each provided with an opening communicating with one of said manifold outlets, the bottom of each tank being provided with an outlet, valves controlling flow through said tank outlets and operated by the movements of said tanks, releasable latches for holding said beam in alternate positions with one tank up and the other down, and float mechanism for controlling said latches.

3. In a liquid measuring apparatus, the combination of a manifold having an inlet and a pair of outlets, a pair of measuring tanks each provided with an inlet communicating one with each of the manifold outlets and each provided with an outlet, said tanks being mounted for simultaneous opposite vertical movements to alternate positions, means for locking said tanks in their alternate positions, valves controlling flow through said tank inlets and outlets, and float mechanism controlling said tank locking means and in consequence thereof controlling the operation of said valves.

4. In a liquid measuring apparatus, the combination of a casing having a discharge outlet, a manifold within the casing provided with an inlet extending through the casing wall and provided with a pair of outlets, a pair of measuring tanks each provided with an inlet communicating one with each of the manifold outlets and each provided with an outlet communicating with the casing outlet, said tanks being mounted for simultaneous opposite vertical movements to alternate positions, means for locking said tanks in their alternate positions, valves for controlling flow through said manifold outlets and said tank outlets, a float mechanism controlling said locking means and in consequence thereof controlling the operation of said valves.

5. In a liquid measuring apparatus, the combination of a manifold having an inlet and a pair of outlets, a pair of measuring tanks each provided with an inlet communicating one with each of the manifold outlets and each provided with an outlet, said tanks being mounted for simultaneous opposite vertical movements to alternate positions, means for locking said tanks in their alternate positions, valves operated by the movements of said tanks for controlling flow through said manifold outlets, valves for controlling flow through said tank outlets, means for controlling said tank locking means, and a register operatively connected to said tanks and adapted to be advanced in response to the movements thereof.

6. In a liquid measuring apparatus, the combination of a manifold having an inlet and two outlets, valves controlling flow through said outlets, a pivoted walking beam connected to said valves for operating them, a pair of measuring tanks attached one to each end of said beam and each provided with an opening communicating with one of said manifold outlets, the bottom of each tank being provided with an outlet, valves controlling flow through said tank outlets and operated by the movements of said tanks, releasable latches for holding said beam in alternate positions, float mechanism for holding said beam in alternate positions, float mechanism for controlling said latches, and a register operatively connected to said tanks and adapted to be advanced in response to the movements thereof.

7. In a liquid measuring apparatus the combination of a casing provided with a discharge outlet, a manifold within said casing and provided with an inlet extending through the wall thereof and having a pair of outlets, valves controlling flow through said manifold outlets, a pivoted walking beam connected to said valves for operating them, a pair of measuring tanks suspended one from each end of the said walking beam, and communicating one with each of said manifold outlets, the bottom of each tank being provided with an outlet, valves carried by said tanks for controlling flow through the outlets thereof, each of said tank outlet valves being provided with a stem adapted to be engaged by said casing to open the valve when the tank is in lowered position, releasable latches for holding said beam in alternate positions with one tank up and the other down, levers pivoted to said walking beam for holding said latches in latching positions, floats connected to said levers for moving them from latch-engaging positions, and a register attached to the exterior of said casing and operatively connected to said tanks.

In testimony whereof, I sign my name.

HOWARD R. KOEHLER.

Witness:
EDWIN O. JOHNS.